US009373962B2

(12) United States Patent
Chen et al.

(10) Patent No.: US 9,373,962 B2
(45) Date of Patent: Jun. 21, 2016

(54) INTELLIGENT ARBITRATION OF POWER LINE BASED COORDINATING SIGNALS BETWEEN MULTIPLE UPS BUSES WITHOUT ANY AUXILIARY SIGNALS

(75) Inventors: Xian Chen, Columbus, OH (US); Kevin Kim Eschhofen, Lewis Center, OH (US)

(73) Assignee: Liebert Corporation, Columbus, OH (US)

(*) Notice: Subject to any disclaimer, the term of this patent is extended or adjusted under 35 U.S.C. 154(b) by 865 days.

(21) Appl. No.: 13/561,154

(22) Filed: Jul. 30, 2012

(65) Prior Publication Data

US 2013/0187467 A1 Jul. 25, 2013

Related U.S. Application Data

(60) Provisional application No. 61/515,353, filed on Aug. 5, 2011.

(51) Int. Cl.
*H01H 47/00* (2006.01)
*B60L 1/00* (2006.01)
*H02J 4/00* (2006.01)
*H02J 9/06* (2006.01)
(Continued)

(52) U.S. Cl.
CPC ... *H02J 4/00* (2013.01); *H02J 3/46* (2013.01); *H02J 9/062* (2013.01); *H02J 13/0062* (2013.01); *G05B 19/4063* (2013.01); *H02J 2009/068* (2013.01); *Y02B 70/3291* (2013.01); *Y02B 90/222* (2013.01); *Y04S 20/12* (2013.01); *Y04S 20/248* (2013.01); *Y10T 307/615* (2015.04)

(58) Field of Classification Search
CPC .......... H02J 13/0062; H02J 3/46; H02J 4/00; H02J 9/062; H02J 2009/068; Y02B 70/3291; Y02B 90/222; Y04S 20/12; Y04S 20/248; Y10T 307/615
USPC ............... 307/64, 43, 52, 82; 363/142, 65, 71
See application file for complete search history.

(56) References Cited

U.S. PATENT DOCUMENTS 6,396,170 B1 * 5/2002 Laufenberg ............. H02J 9/062
307/43
6,693,451 B2 2/2004 Huang et al.
(Continued)

FOREIGN PATENT DOCUMENTS

EP 1833138 A2 9/2007
EP 1944697 A1 7/2008
WO WO-0173921 A2 10/2001

OTHER PUBLICATIONS

Notification of Transmittal of the International Search Report and the Written Opinion of the International Searching Authority for PCT/US2012/048774 mailed Jul. 5, 2013.

*Primary Examiner* — Rexford Barnie
*Assistant Examiner* — Elim Ortiz
(74) *Attorney, Agent, or Firm* — Harness, Dickey & Pierce, P.L.C.

(57) ABSTRACT

A multiple UPS system has a plurality of UPS subsystems with a separate UPS data communications bus coupling a controller of each UPS subsystem to an associated controller of an associated tie cabinet. The multiple UPS system further includes a data communications tie bus that couples the controllers of the tie cabinets to each other. The controllers of the tie cabinets arbitrate power line based coordinating signals between the UPS buses without the use of auxiliary signals.

11 Claims, 7 Drawing Sheets

(51) Int. Cl.
    *H02J 13/00*     (2006.01)
    *H02J 3/46*     (2006.01)
    *G05B 19/4063*     (2006.01)

(56) References Cited

U.S. PATENT DOCUMENTS

| | | | |
|---|---|---|---|
| 7,000,056 B2 | 2/2006 | Poisner | |
| 7,107,365 B1 | 9/2006 | Clark | |
| 2003/0048006 A1* | 3/2003 | Shelter, Jr. | H02J 9/061 307/64 |
| 2005/0043859 A1 | 2/2005 | Tsai et al. | |
| 2006/0167569 A1* | 7/2006 | Colombi | H02J 3/005 700/22 |
| 2007/0210652 A1* | 9/2007 | Tracy | H02J 9/062 307/66 |
| 2008/0114999 A1* | 5/2008 | Terry | H02J 9/061 713/340 |
| 2008/0265680 A1* | 10/2008 | Marwali | H02J 9/062 307/65 |
| 2009/0009001 A1* | 1/2009 | Marwali | H02J 9/061 307/65 |
| 2009/0009011 A1 | 1/2009 | Edelson et al. | |
| 2010/0067269 A1* | 3/2010 | Heber | H02M 7/219 363/87 |
| 2010/0102636 A1* | 4/2010 | Tracy | H02J 9/062 307/80 |

\* cited by examiner

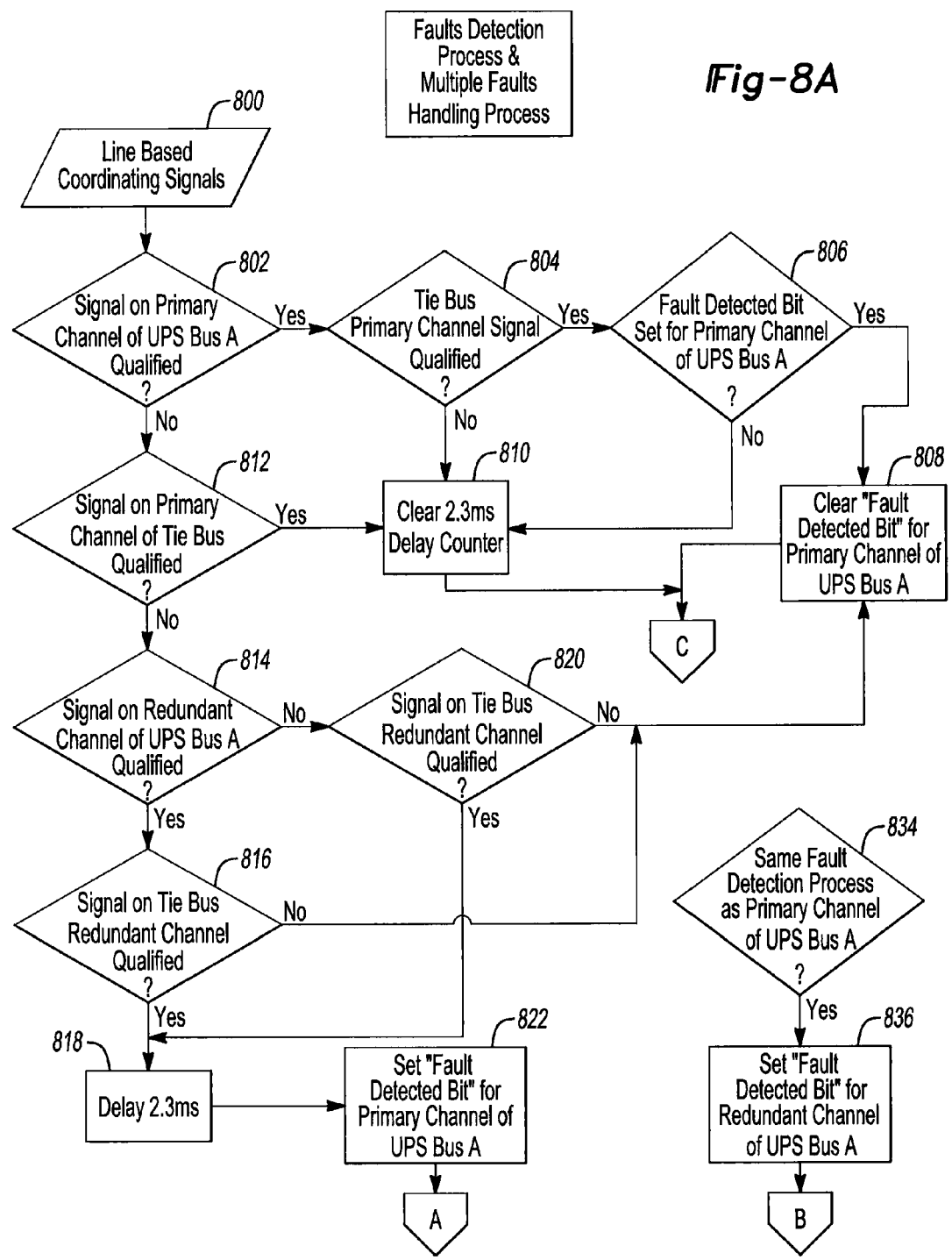

US 9,373,962 B2

INTELLIGENT ARBITRATION OF POWER LINE BASED COORDINATING SIGNALS BETWEEN MULTIPLE UPS BUSES WITHOUT ANY AUXILIARY SIGNALS

CROSS-REFERENCE TO RELATED APPLICATIONS

This application claims the benefit of U.S. Provisional Application No. 61/515,353, filed Aug. 5, 2011. The entire disclosure of the above application is incorporated herein by reference.

FIELD

The present disclosure relates to a multiple UPS system having multimodule UPS systems therein and the arbitration of power line based coordinating signals between multiple UPS data communication buses therein.

BACKGROUND

This section provides background information related to the present disclosure which is not necessarily prior art.

FIG. 1 shows an example of a typical prior art single module UPS system, referred to herein as UPS module 100. The basic elements of UPS module 100 are rectifier 102, inverter 104, output transformer 106, a backup DC power source 108, and a controller 110. UPS module 100 also includes a bypass switch (not shown). An input of rectifier 102 is coupled to a source of AC power (not shown). An output of rectifier 102 is coupled to a DC bus 112. An input of inverter 104 is coupled to DC bus 112. An output 105 of inverter 104 is coupled to a primary side 114 of output transformer 106. A secondary side 116 of output transformer 106 is coupled to output 118 of UPS module 100. A Grass filter circuit 120 is coupled to the secondary side 116 of output transformer 106. A filter circuit 122 is coupled to the primary side 114 of output transformer 106.

Controller 110 controls UPS module 100 including controlling inverter 104 by varying the duty cycle of the switching devices in inverter 104 so that inverter 104 provides a desired output voltage. In this regard, controller 110 has inputs 124 and outputs 126. Inputs 124 include inputs coupled to current transformers CT that sense currents in various parts of UPS module 100 such as shown in FIG. 1, including a load current flowing through output 118 of UPS module 100, and voltage sensors VS that sense voltage such as a primary side voltage at primary side 114 of output transformer 106 or a secondary side voltage at secondary side 116 of output transformer 106.

A multi-module UPS system includes two or more single module UPS systems such as UPS module 100 coupled in parallel. FIG. 2 shows an example of a multi-module UPS 200 having two UPS modules 100 coupled in parallel.

SUMMARY

This section provides a general summary of the disclosure, and is not a comprehensive disclosure of its full scope or all of its features.

In accordance with an aspect of the present disclosure, a multiple UPS system has a plurality of UPS subsystems with a separate UPS data communications bus coupling a controller of each UPS subsystem to an associated controller of an associated tie cabinet. The multiple UPS system further includes a data communications tie bus that couples the controllers of the tie cabinets to each other. The controllers of the tie cabinets arbitrate power line based coordinating signals between the UPS buses without the use of auxiliary signals.

In accordance with an aspect of the present disclosure, each UPS bus and the tie bus each have a primary channel and a redundant channel. The controller of each tie cabinet detects whether faults have occurred on the primary or redundant channels of the associated UPS bus or on the ends of the primary or redundant channels coupled to that controller and reroutes coordinating signals between the primary and redundant channels of the UPS bus and the primary and redundant channels of the tie bus based on where the fault occurred.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings.

Figure 6:
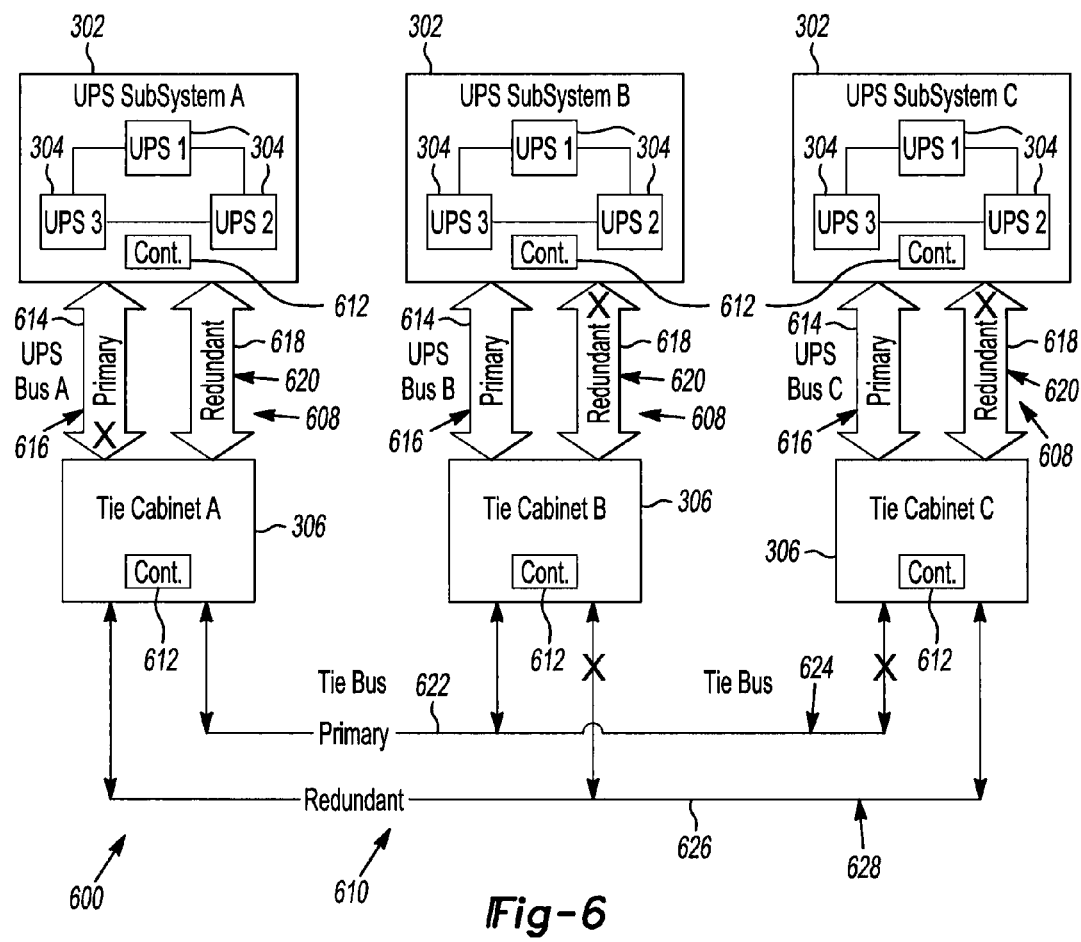
FIG. 6 is a simplified schematic of a multiple UPS system in accordance with an aspect of the present disclosure.
Figure 7:
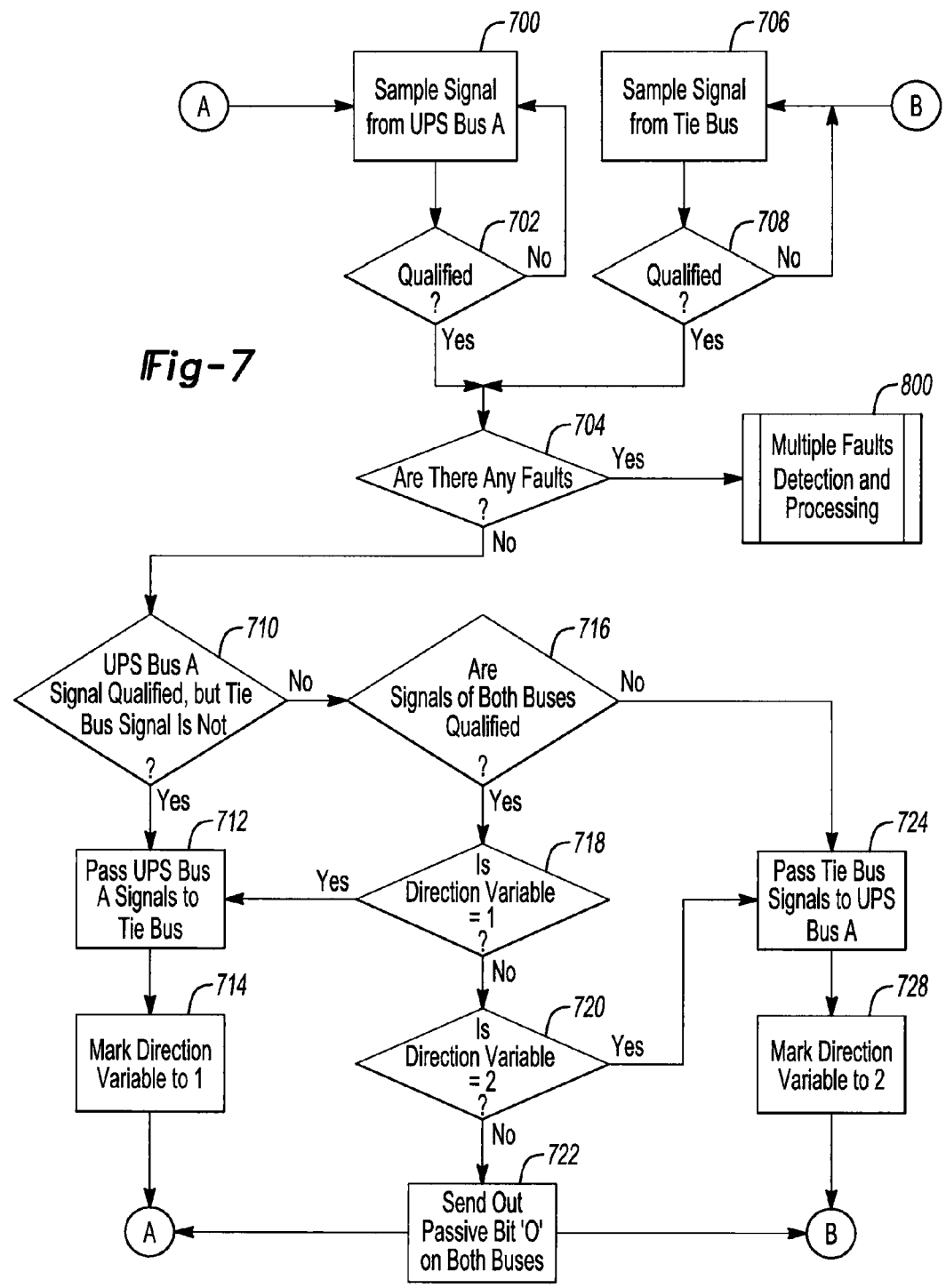

FIG. 7 is a flow chart showing a method of arbitrating coordinating signals among UPS buses of the multiple UPS system of FIG. 6, when there are no faults on the buses, without the use of auxiliary signals in accordance with an aspect of the present disclosure; and FIG. 8 is a flow chart showing a method of detecting and processing multiple faults on UPS buses and a tie bus of the multiple UPS system of FIG. 6 in accordance with an aspect of the present disclosure.

DETAILED DESCRIPTION

Example embodiments will now be described more fully with reference to the accompanying drawings.

A multiple UPS system includes two or more independent multi-module UPS systems. In arbitrating communications between multi-module UPS systems in multiple UPS systems, it has been a challenge not only to keep the design reliable, robust and with a certain degree of isolation between different UPS systems, but also maintain a simple straightforward design without adding additional auxiliary signals, wiring or sensing equipment, which will result in higher cost. In a multiple UPS system available from Liebert Corporation of Columbus, Ohio, reliability and robustness are achieved by using different UPS data communication buses in primary and redundant channels so that failure of one of the primary and redundant channels won't bring down the whole multiple UPS system. To provide isolation between the multi-module UPS systems in this multiple UPS system, the UPS data communication buses are isolated from each other, i.e. one can't see or interfere with the other's data, and the data communication buses need to be bidirectional. Because of the complexity of this architecture design, how to safely and accurately pass through signals between these different multiple UPS data communication buses in two separate channels without adding extra directional auxiliary signals and wiring measurement equipment is important.

Figure 1:
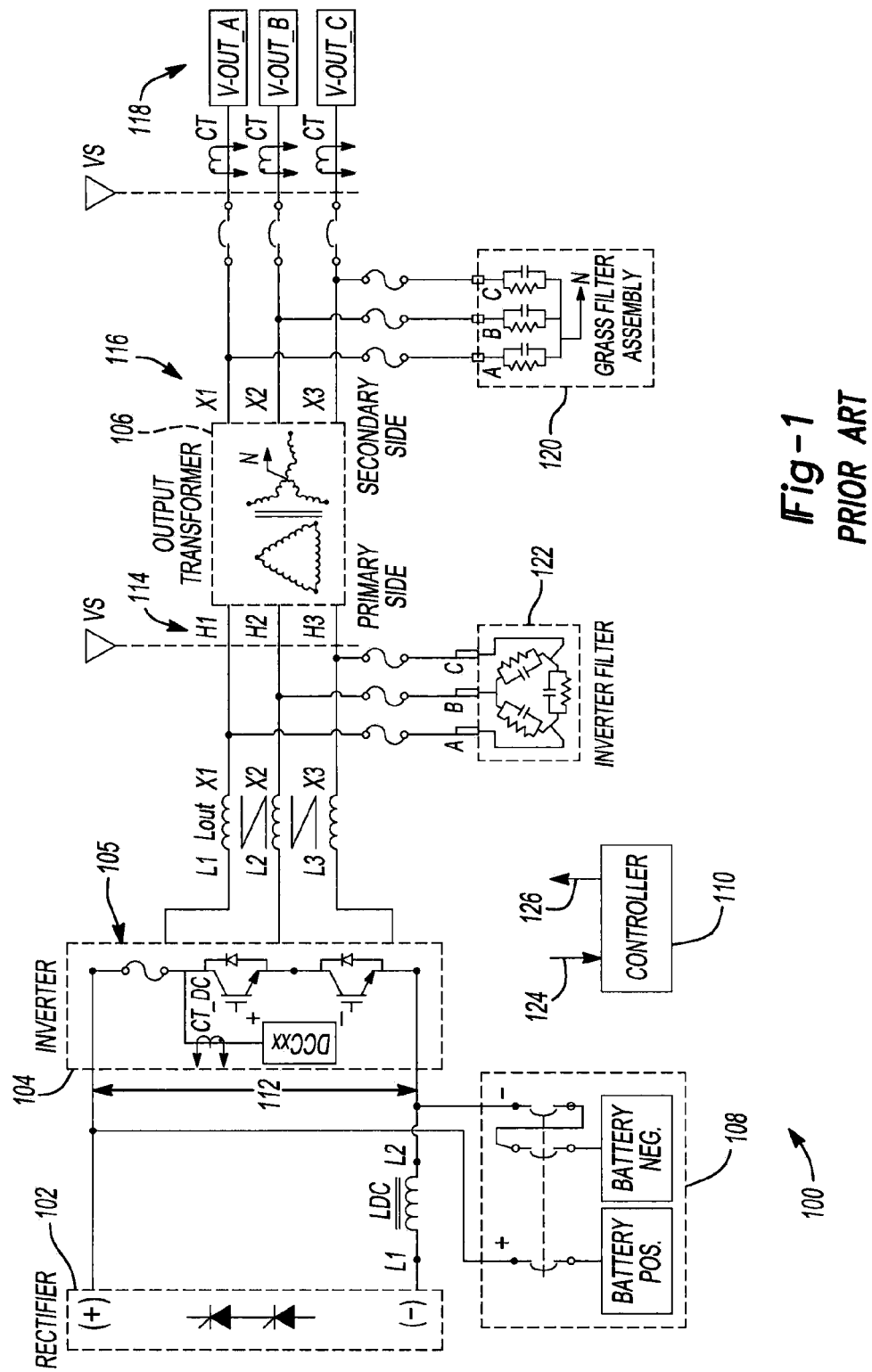
FIG. 1 is a simplified schematic of a prior art single module UPS system.
Figure 2:
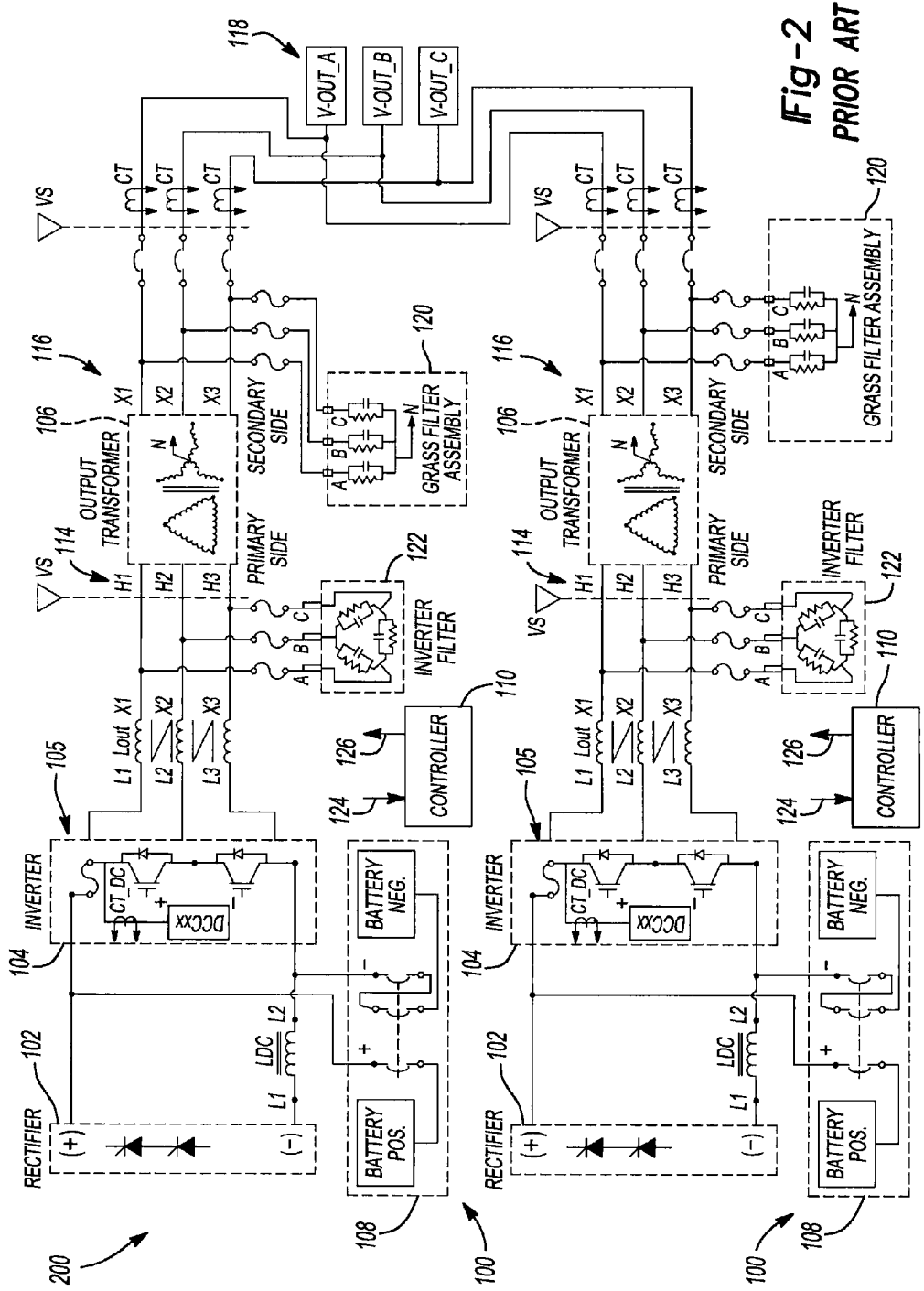
FIG. 2 is a simplified schematic of a prior art multimodule UPS system.
Figure 3:
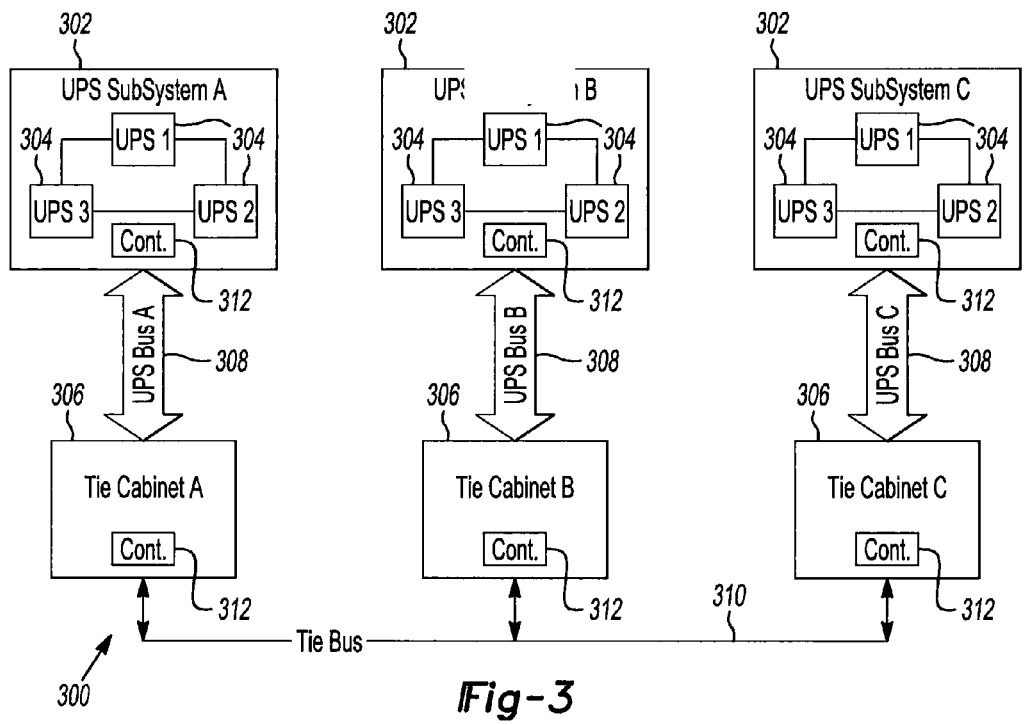
FIG. 3 is a simplified schematic of a multiple UPS system having a plurality of multimodule UPS subsystems.

A multiple UPS system may for example include up to eight independent multi-module UPS systems, which will be subsequently be referred to herein as multi-module UPS subsystems. Each UPS subsystem may for example have up to eight single module UPS systems, which will subsequently be referred to as UPS modules. In an example shown in FIG. 3, a multiple UPS system 300 is shown having three UPS subsystems 302, with each UPS subsystem 302 having three UPS modules 304. Each UPS module 304 may, for example, be a UPS module 100. The three UPS subsystems 302 will be referred to herein as UPS SubSystem A, UPS SubSystem B, and UPS SubSystem C. The three UPS modules 304 will be referred to herein as UPS 1, UPS 2, and UPS 3. Multiple UPS system 300 also includes a tie cabinet 306 associated with each UPS subsystem 302, referred to herein as Tie Cabinet A, Tie Cabinet B and Tie Cabinet C. Tie cabinets, as the term implies, are known devices that tie two or more UPS subsystems 302 together to parallel the output buses of the UPS subsystems 302 and/or to provide redundancy. This can be momentarily paralleling the output buses to switch a load from one UPS subsystem 302 to another or continuously paralleling the output buses to provide increased power capacity. While FIG. 3 shows the tie cabinets 306 (Tie Cabinets A, B and C) separately, it should be understood that the functionality of each tie cabinet 306 associated with a UPS subsystem 302 could be implemented together with one or more of the tie cabinets associated with one or more of the other UPS subsystems 302.

The system architecture of multiple UPS system 300 includes a separate data communication bus, referred to herein as UPS bus 308, coupling each UPS subsystem 302 to a respective tie cabinet 306 and a Tie Bus 310. In the example shown in FIG. 3, multiple UPS system 300 has four separate data communications buses, Tie Bus 310 and three UPS buses 308 (UPS Bus A, UPS Bus B and UPS Bus C) coupling each UPS subsystem 302 to its respective tie cabinet 306. More specifically, UPS Bus A couples controller 312 of UPS SubSystem A to controller 312 of Tie Cabinet A, UPS Bus B couples controller 312 of UPS SubSystem B to controller 312 of Tie Cabinet B, and UPS Bus C couples controller 312 of UPS SubSystem C to controller 312 of Tie Cabinet C. Tie bus 310 couples the controllers 312 of Tie Cabinet A, Tie Cabinet B and Tie Cabinet C to each other. Having different data communication buses coupling the controllers 312 of UPS subsystems 302 to the controllers 312 of respective tie cabinets 306 and coupling the controllers 312 of tie cabinets 306 ensure good isolation and reliable operation conditions among the UPS subsystems 302 and tie cabinets 306. It should be understood that if multiple UPS system 300 has other than three UPS subsystems 302, it will have other than three UPS buses 308 (e.g., it will have one UPS bus for each UPS subsystem 302).

There can be different kinds of bus logic and power line based coordinating signals (referred to herein as coordinating signals). A coordinating signal is used to synchronize UPS subsystems 302 so that the power outputs of the UPS subsystems 302 that are not the designated master UPS subsystem are in synchronization with the power output of the UPS subsystem 302 that is the designated master UPS subsystem. Illustratively, 'OR' Logic is used on the UPS buses (UPS Bus A, UPS Bus B and UPS Bus C), i.e. logic '1' dominant. The transition from '0' to '1' is used to coordinate operations between UPS subsystems 302 and the duration of logic '1' is used to communicate necessary information. For example, the '0' to '1' transition is used to synchronize the voltage zero crossing of each UPS subsystem 302 and the duration of '1' in a logic cycle, determined by two successive '1' to '0' transitions, is used to coordinate which UPS subsystem 302 is the master UPS subsystem among all the UPS subsystems 302. The master UPS subsystem 302 is the UPS subsystem 302 that all the other UPS subsystems 302 follow. There will be only one master UPS subsystem 302 and whichever UPS subsystem 302 outputs the longest logic '1' on its respective UPS Bus will be the master UPS subsystem 302 based on user setting. A user sets which UPS subsystem 302 is the master UPS subsystem. However, abnormal operation conditions can override the user setting where a new master is determined. The UPS subsystem that outputs the longest duration logic '1' becomes the master.

Figure 4:
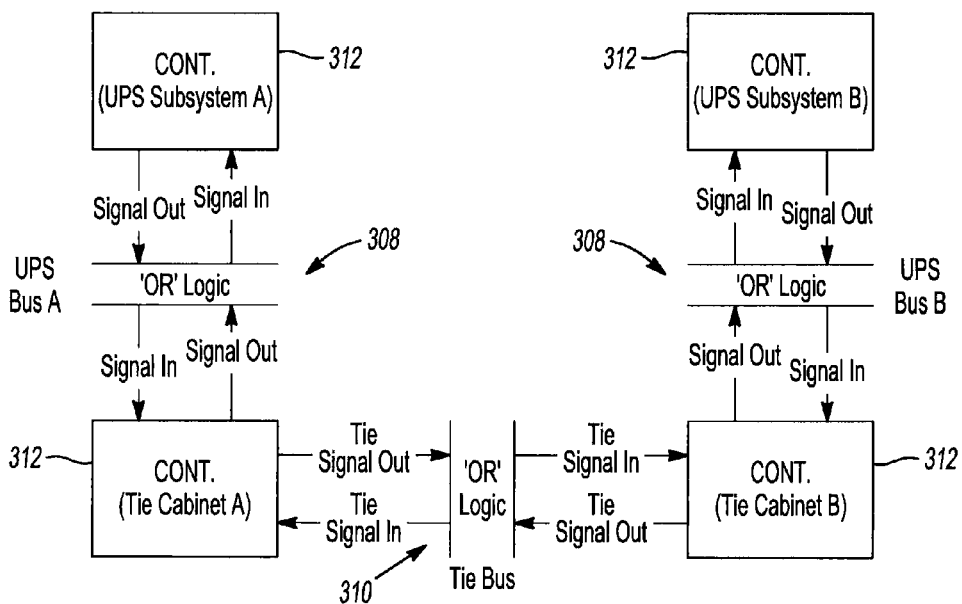
FIG. 4 is simplified communication diagram showing the data communication of a multiple UPS system having two multimodule UPS subsystems.

Each UPS subsystem 302 and tie cabinet 306 includes a controller 312 that serves as a gateway between the tie bus and the respective UPS bus so that if the coordinating signal is sent from one of the UPS subsystems 302, it will be received by all the rest of UPS subsystems 302. In each UPS subsystem 302, all UPS modules 304 are operated and running based on the coordinating signal received from its respective UPS Bus. FIG. 4 shows a communication diagram between two UPS subsystems 302. Each controller 312 has the ability to read signals from and pass signals out on to the UPS bus 308 coupled to it. Controller 312 may illustratively be a Field Programmable Gate Array (FPGA). It should be understood that controller 312 could be other types of electronic devices, such as a microcontroller, microprocessor, CPLD or ASIC, by way of example and not of limitation.

Figure 5:
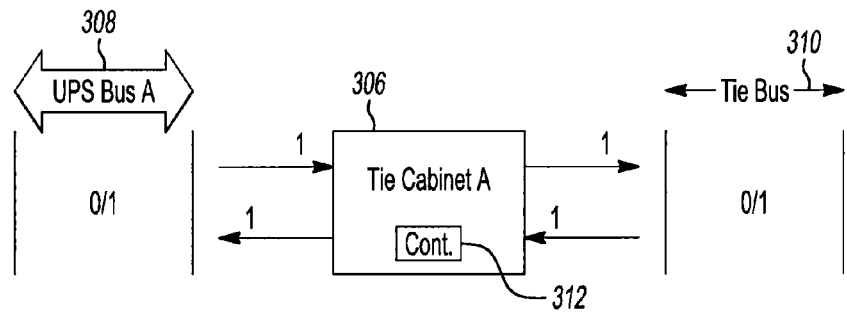
FIG. 5 is a simplified diagram showing a connection of a UPS bus to a tie bus by a tie cabinet.

According to a basic characteristic of UPS buses 308, they are logic '1' dominant. If any controller puts a '1' on the bus, all the other controllers will get '1'. For example, assume UPS SubSystem A is the master UPS subsystem and is sending out coordinating signals ('0', '1' in a fixed line based frequency and have a '0' to '1' transition when its output is having a positive zero crossing) and the rest of UPS subsystems 302 need to receive and follow the coordinating signal. Since the Tie Cabinet A does not know which direction it should pass coordinating signals, controller 312 of Tie Cabinet A can only keep reading from each side (UPS Bus A and Tie Bus 310) and pass the coordinating signal through, as shown in the FIG. 5. The Tie Cabinet A will get a '1' from UPS Bus A and pass it to Tie Bus 310, while reading a coordinating signal from Tie Bus 310 and sending it back to UPS Bus A, or vice versa. Since this is a coordinating signal, the delay of the signal passing should be as small as possible. This process needs to be done almost at the same time. This approach is used by UPS modules 304 within the UPS subsystems 302. This approach works fine if there's only one UPS bus 308 which is connected to all the UPS modules 304, but for multiple independent UPS buses 308, it won't work. Because once there's a '1' on UPS Bus A and it is passed to Tie Bus 310, then immediately a '1' is read back from Tie Bus 310 and passed back to UPS Bus A. UPS Bus A will be '1' and stay '1' no matter what UPS subsystem A is putting out on UPS Bus A afterwards. The same thing happens when trying to read the Tie Bus 310 first and sending a '1' back to UPS Bus A. A '1' will be immediately read back from UPS Bus A and passed back to the Tie Bus 310. After that, the Tie Bus 310 will be at a logic '1' no matter what the other controllers 312 in the other tie cabinets 306 try to put on the Tie Bus 310.

One way to solve this issue is to introduce auxiliary signals to indicate the direction, so the tie cabinets 306 will know whether to read or write and which direction it should pass the coordinating signal. But this would involve an additional wire or wires, additional signal conditioning circuitry and perhaps additional measurement and sensing circuitry.

In accordance with an aspect of the present disclosure, arbitration of coordinating signals (that is, power based line coordinating signals) among multiple UPS data communication buses in a multiple UPS system, such as multiple UPS system 600 (FIG. 6), is implemented without the use of auxiliary signals. Multiple UPS system 600 has, with the following exceptions, the same elements as multiple UPS system 300 and the following discussion will focus on the differences.

In accordance with an aspect of the present disclosure, multiple UPS system 600 includes UPS buses 608 that each have a two wire system, with one wire 614 providing a primary channel 616 and the other wire 618 providing a redundant channel 620. Multiple UPS system 600 also has a Tie Bus 610 that has also has a two wire system, with one wire 622 providing a primary channel 624 and the other wire 626 providing a redundant channel 628. If one of the wires is open, the other wire will still function as normal and this architecture accommodates multiple failures on multiple different UPS buses 608, and on Tie Bus 610. In accordance with an aspect of the present disclosure, UPS subsystems 302 and tie cabinets 306 include controllers 612 that implement arbitration of coordinating signals without the use of auxiliary signals. In accordance with an aspect of the present disclosure, controllers 612 also implement multiple fault detection and processing.

Turning first to the arbitration of coordinating signals without the use of auxiliary signals, assume that UPS subsystem A is the master UPS subsystem and it outputs the coordinating signals on UPS Bus A. The controller 612 of each UPS subsystem 302 always monitors its own UPS bus 608. When a UPS subsystem 302 is designated to be the master UPS subsystem, controller 612 of that UPS subsystem 302 will first listen to the UPS bus 608 of that UPS subsystem 302 to see if there is a coordinating signal already present on its UPS Bus. If no coordinating signal is present on its UPS the bus 608, the controller 612 of that UPS subsystem 302 will start to send out a coordinating signal on its UPS bus 608. If there is already a coordinating signal present on the UPS bus 608 of that UPS subsystem 302, the controller 612 of that UPS subsystem 302 will post an error warning to the user that there's already another UPS subsystem 302 acting as a master UPS subsystem, and controller 612 of the UPS subsystem 302 designated as the master UPS subsystem won't send out any coordinating signals on the UPS bus 608 of that UPS subsystem 302.

Based on this characteristic, in accordance with an aspect of the present disclosure, the controller 612 of the tie cabinet 306 associated with the UPS subsystem 302 designated as the master UPS subsystem will constantly check the UPS bus 608 of that UPS subsystem 302 and Tie Bus 610 for qualified coordinating signals. Qualified coordinating signals are "0' to '1' transitions happening at a fixed period determined by the system configuration (e.g., whether the system is a 50 Hz or 60 Hz system). Using again as an example UPS SubSystem A having been designated as the master UPS subsystem, controller 612 of Tie Cabinet A will only pass through the first qualified coordinating signal it receives from either UPS Bus A or Tie Bus 610 and won't send back a coordinating signal from the other of UPS Bus A or Tie Bus 610 to which it is passing a coordinating signal. For example, if Tie Cabinet A first gets a qualified coordinating signal from UPS Bus A and nothing from Tie Bus 610, controller 612 in Tie Cabinet A then assumes that it should pass through the coordinating signal to Tie Bus 610. Controller 612 of Tie Cabinet A doesn't pass a coordinating signal from Tie Bus 610 back to UPS Bus A. Consequently, UPS Bus A's coordinating signal won't lock up at '1' and it will change based on what controller 612 of UPS SubSystem A is sending out. If UPS Bus A's coordinating signal become disqualified, i.e. UPS SubSystem A stops sending out coordinating signals (for example, UPS SubSystem A may no longer be the master UPS SubSystem) or it starts to send out bad signals, controller 612 in Tie Cabinet A will stop passing through the coordinating signals from UPS Bus A to Tie Bus 610 and starts monitoring both UPS Bus A and Tie Bus 610 for qualified coordinating signals. If it detects that the Tie Bus 610 coordinating signals become qualified, i.e. another UPS subsystem 302 has become the master UPS subsystem, controller 612 in Tie Cabinet A will start to pass the coordinating signals from Tie Bus 610 to UPS Bus A so that UPS SubSystem A can follow the coordinating signals from the master UPS subsystem. In this way, controller 612 of Tie Cabinet A prevents passing '1's from locking up both UPS Bus A and Tie Bus 610 and is able to efficiently pass coordinating signals through between UPS Bus A and Tie Bus 610 without any auxiliary signals to tell the direction of the coordinating signals. The controllers 612 in the other tie cabinets 306 operate in the same manner.

FIG. 7 is a flow chart showing the logic by which a controller 612 a tie cabinet 306 implements the above described determination of the direction of the coordinating signal without any auxiliary signals. This logic may, for example, be implemented in software programmed in controller 612.

Again assuming that UPS SubSystem A is the master UPS subsystem 302, starting at 700 in FIG. 7, controller 612 of Tie Cabinet A samples the signal on UPS Bus A. At 702, controller 612 of Tie Cabinet A determines if this signal is a qualified coordinating signal. If not, controller 612 branches back to 700. If the signal on UPS Bus A is a qualified coordinating signal, at 704 controller 612 of Tie Cabinet A determines if there are any faults. If so, controller 612 of Tie Cabinet A branches at 800 to the multiple faults detection and processing routine described below with reference to FIG. 8. Referring now to 706, controller 612 of Tie Cabinet A samples the signal on Tie Bus 610. At 708, controller 612 of Tie Cabinet A determines if the signal on Tie Bus 610 is a qualified coordinating signal. If not, controller 612 branches back to 706. If the signal on Tie Bus 610 is a qualified coordinating signal, controller 612 branches to 704 where it determines if there are any faults as discussed above.

If at 704 controller 612 of Tie Cabinet A determines that there are no faults, controller 612 of Tie Cabinet A branches to 710 where it determines whether the signal on UPS Bus A is a qualified coordinating signal and the signal on Tie Bus 610 is not. If the signal on UPS A is a qualified coordinating signal and the signal on Tie Bus 610 is not, controller 612 of Tie Cabinet A branches to 712 where it passes the coordinating signal on UPS Bus A to Tie Bus 610 and at 714, marks a direction variable to '1' and then branches back to 700. If this is not the case, controller 612 of Tie Cabinet A branches to 716 where it determines whether the signals on both UPS Bus A and Tie Bus 610 are qualified coordinating signals. If the signals on both UPS Bus A and Tie Bus 610 are both qualified coordinating signals, controller 612 of Tie Cabinet A branches to 718 where it determines if the direction variable is equal to '1'. If the direction variable is equal to '1', controller 612 of Tie Cabinet A branches to 712. If the direction variable is not equal to '1', controller 612 of Tie Cabinet A branches to 720 where it determines if the direction variable is equal to '2'. If the direction variable is not equal to '2', controller 612 of Tie Cabinet A branches to 722 where it sends out a passive bit on both UPS Bus A and Tie Bus 610. Controller 612 of Tie Cabinet A then branches back to 700 and 706 (as controller 612 is parallel sampling signals on UPS Bus A and on Tie Bus 610). It should be understood that the direction variable for each of the primary and redundant channels of a UPS bus 608 determines whether a coordinating signal is passed from that channel to the Tie Bus 610, or vice-versa.

If at 716 controller 612 of Tie Cabinet A determines that the signals on both UPS Bus A and Tie Bus 610 were both not qualified coordinating signals, controller 612 of Tie Cabinet A branches to 724 where it passes the signals on Tie Bus 610 to UPS Bus A and at 726, marks the direction variable equal to '2' and then returns to 706.

Turning now to multiple faults detection and multiple faults processing, as shown in FIG. 6, there are a total of five faults occurring, three on three different independent UPS buses 608 and two on respective connections of Tie Bus 610 to Tie Cabinet B and Tie Cabinet C. Each fault is indicated with an "X." If UPS SubSystem A is sending out coordinating signals, i.e. UPS subsystem A is the master UPS subsystem, controller 612 in Tie Cabinet A will automatically detect the fault in primary channel 616 of UPS Bus A and reroute the coordinating signal from redundant channel 620 of UPS Bus A to both primary and redundant channels 624, 628 of Tie Bus 610. Likewise, controller 612 of Tie Cabinet B will detect the fault occurring on its end of redundant channel 628 of Tie Bus 610 and reroute the coordinating signals from primary channel 624 of Tie Bus 610 to both the primary and redundant channels 616, 620 of UPS Bus B. Controller 612 of Tie Cabinet C will detect the fault occurring on its end of primary channel 624 of Tie Bus 610 and reroute the coordinating signals from redundant channel 628 of Tie Bus 610 to both primary and redundant channels 616, 620 of UPS Bus C. In this case, controllers 612 in Tie Cabinets B and C don't care about the status of UPS Bus B and UPS Bus C because the controllers 612 in UPS SubSystems B and C will receive the qualified coordinating signals from either the primary or redundant channels 616, 620 of their respective UPS Bus B and UPS Bus C. Since UPS SubSystems B and C are not the master UPS subsystem, controllers 612 in Tie Cabinets B and C expect that they will be receiving qualified coordinating signals on both primary channel 624 and redundant channel 628 of Tie Bus 610. If they do not receive a qualified coordinating signal on primary channel 624 of Tie Bus 610, they determine that a fault occurred on primary channel 624. If they do not receive a qualified coordinating signal on redundant channel 628 of Tie Bus 610, they determine that a fault occurred on redundant channel 628. It should be understood that in the normal case where there are no failures, controllers 612 of tie cabinets 306 pass signals between the primary channels 616 of the respective UPS buses 608 and the primary channel 624 of Tie Bus 610, and between the redundant channels 620 of UPS buses 608 and the redundant channel 628 of Tie Bus 610.

In this foregoing multiple faults detection and multiple faults detection process, the controllers 612 in all the tie cabinets 306 will still operate and pass through coordinating signals without any auxiliary signals. This makes multiple UPS system 600 more reliable and robust and also keeps it easy to operate as this process occurs automatically.

Illustratively, the above multiple faults detection and handling process of the present disclosure is implemented in two logic parts: a Faults Detection Process and a Multiple Faults Handling Process. In the Faults Detection Process, controller 612 in the applicable tie cabinet 306 will detect the fault based on the coordinating signal it gets from both primary and redundant channels 616, 620 of its respective UPS bus 608. Assuming that UPS SubSystem A is the master UPS subsystem and that primary channel 616 of UPS Bus A has failed, controller 612 of UPS SubSystem A will be sending out coordinating signals on both the primary and redundant channels 616, 620 of UPS Bus A without knowing that primary channel 616 of UPS Bus A has failed. In this case, controller 612 in Tie Cabinet A will be continuously receiving qualified coordinating signals from redundant channel 620 of UPS Bus A, but will not be receiving any coordinating signals from primary channel 616 of UPS Bus A. It also will not be receiving any coordinating signals from the primary and redundant channels 624, 628 of Tie Bus 610 since UPS SubSystem A is the master UPS subsystem. So based on the signals coming from the primary and redundant channels 616, 620 of UPS Bus A and the lack of signals coming from the primary and redundant channels 624, 628 of Tie Bus 610, controller 612 in Tie Cabinet A determines that primary channel 616 of UPS Bus A has failed. After a certain period of delay, controller 612 in Tie Cabinet A sets a "fault detected bit" for primary channel 616 of UPS Bus A and starts rerouting coordinating signals from redundant channel 620 of UPS Bus A to both primary and redundant channels 624, 628 of Tie Bus 610.

Controller 612 in Tie Cabinet A will clear the "fault detected bit" for primary channel 616 of UPS Bus A if it later starts receiving qualified coordinating signals from primary channel 616 of UPS Bus A. Likewise, controller 612 in Tie Cabinet B will detect that it is receiving unqualified signals from redundant channel 628 of Tie Bus 610, redundant channel 620 of UPS Bus B and primary channel 616 of UPS Bus B, and only receiving qualified coordinating signals on primary channel 624 of Tie Bus 610. Upon detecting that this is the case, controller 612 of Tie Cabinet B then reroutes the qualified coordinating signals on primary channel 624 of Tie Bus 610 to both the primary and redundant channels 616, 620 of UPS Bus B and after a certain period of delay, sets a "fault detected bit" for redundant channel 628 of Tie Bus 610. Controller 612 in Tie Cabinet C handles the fault on its end of primary channel 624 of Tie Bus 610 in similar fashion, but reroutes the qualified coordinating signals from redundant channel 628 of Tie Bus 610 to the primary and redundant channels 616, 620 of UPS Bus C, instead of from primary channel 624 of Tie Bus 610. Controller 612 in Tie Cabinet C also sets a "fault detected bit" for primary channel 624 of Tie Bus 610 instead of redundant channel 628 of Tie Bus 610. An "unqualified" signal is a signal that doesn't have the characteristics of a qualified coordinating signal, such as not matching the system frequency, or not alternating in the appropriate manner.

When controller 612 in Tie Cabinet A is not receiving any qualified coordinating signals from any of the primary and redundant channels 616, 620 of UPS Bus A or the primary and redundant channels 624, 628 of Tie Bus 610 and detects that this is the case, controller 612 in Tie Cabinet A assumes that there has been a change in which of the UPS subsystems 302 is the master UPS subsystem. Upon doing so, it then clears the "fault detected bit" for primary channel 616 of UPS Bus A and waits for new qualified coordinating signals, just as it does at the beginning of the process. In this regard, there are only two cases that can result in the primary and redundant channels 616, 620 of UPS Bus A and the primary and redundant channels 624, 628 of Tie Bus 610 all not having qualified coordinating signals. One is that there has been a change in which of the UPS subsystems 302 is the master UPS subsystem so that the original master UPS subsystem has stopped sending coordinating signals. The other is that none of the UPS buses 608 are working. But it's meaningless to say which UPS bus 608 has failed if none of them are working. So in cases where there are no qualified coordinating signals on any of the primary and redundant channels, 616, 620 of UPS Bus A and the primary and redundant channels 624, 628 of Tie Bus 610 (when UPS SubSystem A has been the master UPS subsystem), controller 612 of Tie Cabinet A assumes that there has been a change in which of the UPS subsystems 302 is the master UPS subsystem and clears the "fault detected bit" for primary channel 616 of UPS Bus A. A failure in the redundant channel 620 of UPS Bus A (when UPS SubSystem A is the master UPS subsystem) is handled by the controller 612 of tie cabinet 306 in the same manner, except that it reroutes coordinating signals from the primary channel 616 of UPS Bus A to the primary and redundant channels 624, 628 of Tie Bus 610 instead of from the redundant channel 620 of UPS Bus A, and sets a "fault detected bit" for redundant channel 620 of UPS Bus A instead of primary channel 616.

FIG. 8 is a flow chart showing the logic by which a controller 612 of a tie cabinet 306 implements the above described Faults Detection Process and Multiple Faults Handling Process. This logic may, for example, be implemented in software programmed in controller 612.

Figure 8B:
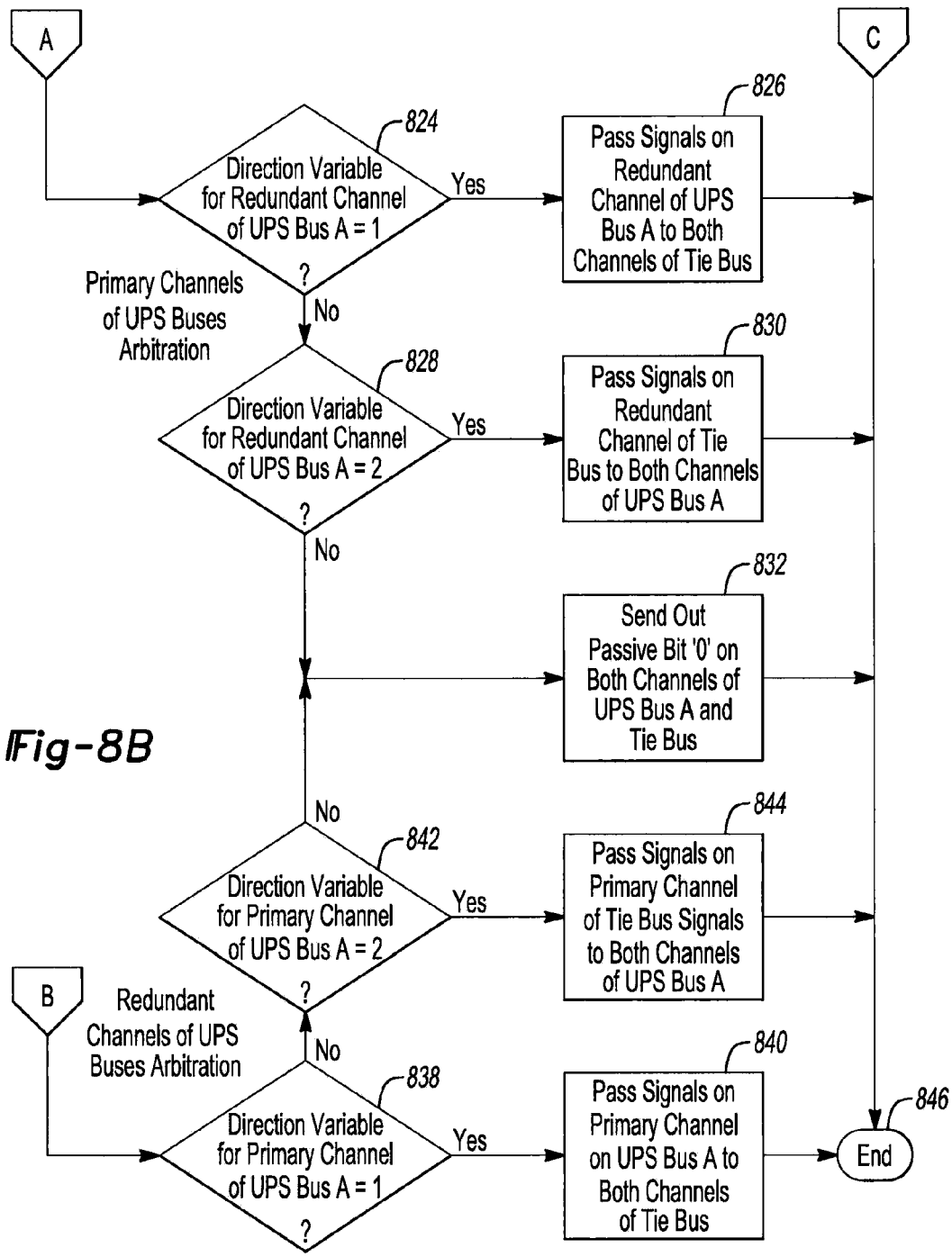

Again assuming that UPS SubSystem A is the master UPS subsystem, at 800 controller 612 of Tie Cabinet A receives coordinating signals on UPS Bus A and/or Tie Bus 610. At 802, controller 612 of Tie Cabinet A determines whether it has received a qualified coordinating signal on primary channel 616 of UPS Bus A. If controller 612 of Tie Cabinet A has received a qualified coordinating signal on primary channel 616 of UPS A, controller 612 of Tie Cabinet A branches to 804 where it determines if it has also received a qualified coordinating signal on primary channel 624 of Tie Bus 610. If controller 612 of Tie Cabinet A has received a qualified coordinating signal on primary channel 624 of Tie Bus 610, controller 612 of Tie Cabinet A branches to 806 where it determines if the "fault detected bit" for primary channel 616 of UPS Bus A has been set indicating that had occurred on primary channel 616 of UPS Bus A. If controller 612 of Tie Cabinet A determines that the "fault detected bit" for primary channel 616 of UPS Bus A has been set, it branches to 808 where it clears the "fault detected bit" for primary channel 616 of UPS Bus A, and then branches at 846 (FIG. 8B) to the end of the Faults Detection Process and Multiple Faults Handling Process routine. If at 804 controller 612 of Tie Cabinet A determines that the coordinating signal on primary channel 624 of Tie Bus 610 was not qualified, or at 806 determines that the "fault detected bit" for primary channel 616 of UPS B was not set, controller 612 of Tie Cabinet A branches to 810 where it clears a delay counter (illustratively, a 2.3 ms delay counter) and then branches to the end of the Faults Detection Process and Multiple Faults Handling Process routine at 846 (FIG. 8B).

Referring back to 802, if controller 612 of Tie Cabinet A determines that the coordinating signal on primary channel 616 of UPS Bus A was not qualified, it branches to 812 where it determines if the coordinating signal on primary channel 624 of Tie Bus 610 was qualified. If the coordinating signal on primary channel 624 of Tie Bus 610 was qualified, controller 612 of Tie Cabinet A branches to 810. If the coordinating signal on primary channel 624 of Tie Bus 610 was not qualified, controller 612 of Tie Cabinet A branches to 814 where it determines if the coordinating signal on redundant channel 620 of UPS Bus A was qualified. If the coordinating signal on redundant channel 620 of UPS Bus A was qualified, controller 612 of Tie Cabinet A branches to 816 where it determines if the coordinating signal on redundant channel 628 of Tie Bus 610 was qualified. If the coordinating signal on redundant channel 628 of Tie Bus 610 was qualified, controller 612 of Tie Cabinet A branches to 818 where it delays for a delay period (such as 2.3 ms) and after the delay period, sets the delay counter and branches to 822 where it sets a "fault detected bit" for primary channel 616 of UPS Bus A as it has determined that a fault has occurred on primary channel 616 of UPS Bus A.

Referring back to 814, if controller 612 of Tie Cabinet A determined that the coordinating signal on UPS Bus A was not qualified, it branches to 820 where it determines if the coordinating signal on redundant channel 628 of Tie Bus 610 was qualified. If the coordinating signal on redundant channel 628 of Tie Bus 610 was not qualified, controller 612 of Tie Cabinet A branches to 808. If at 820 controller 612 of Tie Cabinet A determines that the coordinating signal on redundant channel 820 of Tie Bus 610 was qualified, it branches to 818.

Referring back to 816, if controller 612 of Tie Cabinet A determines that the coordinating signal on redundant channel 628 of Tie Bus 610 was not qualified, it branches to 808.

The foregoing described with reference to 802-822 comprise a routine for the Multiple Faults Detection Process for the primary channel of the UPS Bus 608 of the UPS subsystem 302 that is the master UPS subsystem. In this regard, controller 612 includes a comparable routine for the Multiple Faults Detection Process for the redundant channel of the UPS Bus 608 of the UPS subsystem 302 that is the master UPS subsystem, indicated by boxes 834, 836 for simplicity.

Returning to 822 where controller 612 of Tie Cabinet A has reached the determination that a fault has occurred on primary channel 616 of UPS Bus A, controller 612 of Tie Cabinet A branches to 824 (FIG. 8B) where it determines if the direction variable is equal to '1' for redundant channel 620 of Tie Bus A. If the direction variable is equal to '1' for redundant channel 620 of Tie Bus A, controller 612 of Tie Cabinet A branches to 826 where it passes the coordinating signals on redundant channel 620 of UPS Bus A to both the primary channel 624 and the redundant channel 628 of Tie Bus 610, and then branches to the end of the Faults Detection Process and Multiple Faults Handling Process routine at 846. If at 824 controller 612 of Tie Cabinet A determines that the direction variable for redundant channel 620 of UPS Bus was not equal to '1', it branches to 828 where it determines if the direction variable for redundant channel 620 of UPS Bus A is equal to '2'. If the direction variable for redundant channel 620 of UPS Bus A is equal to '2', controller 612 of Tie Cabinet A branches to 830 where it passes the coordinating signals on redundant channel 628 of Tie Bus 610 to both the primary channel 616 and the redundant channel 620 of UPS Bus A, and then branches to the end of the Faults Detection Process and Multiple Faults Handling Process routine at 846. If at 828 controller 612 determines that the direction variable for redundant channel 620 of UPS Bus A is not equal to '2', it branches to 832 where it sends out a passive bit "0" on the primary and redundant channels of both UPS Bus A and Tie Bus 610, and then then branches to the end of the multiple faults detection and handling routine at 846.

Referring to 834 (FIG. 8A) where controller 612 of Tie Cabinet A has executed the multiple faults detection routine for redundant channel 620 of UPS Bus A and has branched to 836 (FIG. 8A) having reached the determination that a fault occurred on redundant channel 620 of UPS Bus A and sets a "fault detected bit" for redundant channel 620 of UPS Bus A, controller 612 of Tie Cabinet A branches to 838 (FIG. 8B) where it determines if the direction variable is equal to '1' for primary channel 616 of UPS Bus A. If the direction variable is equal to '1' for primary channel 616 of UPS Bus A, controller 612 of UPS Bus A branches to 840 where it passes the coordinating signals on primary channel 616 of UPS Bus A to both the primary channel 624 and the redundant channel 628 of Tie Bus 610, and then branches to the end of the Faults Detection Process and Multiple Faults Handling Process routine at 846. If at 838 controller 612 of Tie Cabinet A determines that the direction variable for primary channel 616 of UPS Bus is not equal to '1', it branches to 842 where it determines if the direction variable for primary channel 616 of UPS Bus A is equal to '2'. If the direction variable for primary channel 616 of UPS Bus A has been set to '2', controller 612 of Tie Cabinet A branches to 844 where it passes the coordinating signals on redundant channel 628 of Tie Bus 610 to both the primary channel 616 and the primary channel 616 of UPS Bus A, and then branches to the end of the multiple faults detection and handling routine at 846. If at 842 controller 612 determines that the direction variable for primary channel 616 of UPS Bus A is not equal to '2', it branches to 832.

The foregoing described with reference to 824-832 and 838-844 comprise a routine for the Multiple Faults Handling Process and will be referred to herein as the multiple faults handling routine. The multiple faults detection routines for primary channel 616 of UPS Bus A and redundant channel 620 of UPS Bus A and the multiple faults handling routine collectively comprise the routine for the Multiple Faults Detection and Multiple Faults Handling Process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A multiple uninterruptible power supply ("UPS") system, comprising:
   a. a plurality of UPS subsystems with a separate UPS data communications bus coupling a controller of each UPS subsystem to an associated controller of an associated tie cabinet;
   b. a data communications tie bus that couples the controllers of the tie cabinets to each other;
   c. wherein the controller of each tie cabinet monitors the UPS data communications bus to which it is coupled and the data communications tie bus for qualified power line based coordinating signals and passes through a qualified power line based coordinating signal it first receives from either the UPS data communications bus to which it is coupled or the data communications tie bus to the other of the UPS data communications bus to which it is coupled or the data communications tie bus and does not pass a power line based coordinating signal from the other bus to the bus from which that controller first received the qualified power line based coordinating signal as long as that controller continues to receive qualified power line based coordinating signals from the bus from which that controller first received the qualified power line based coordinating signal; wherein when the controller of any tie cabinet that has been receiving qualified power line based coordinating signals from the UPS data communications bus to which it is coupled detects that it is no longer receiving qualified power line coordinating signals from that UPS data communications bus, the controller of that tie cabinet ceases passing through the power line based coordinating signals from that UPS data communications bus to the data communications tie bus and starts monitoring that UPS data communications bus and the data communications tie bus for qualified power line based coordinating signals; and
   each UPS data communications bus including a primary channel and a redundant channel and the data communications tie bus including a primary channel and a redundant channel wherein the controller for each tie cabinet monitors for faults the primary and redundant channels of the UPS data communications bus to which it is coupled and the primary and redundant channels of the data communications tie bus and that controller determining that there is a fault on the primary channel of one of the UPS data communications bus to which it is coupled and the data communications tie bus when that controller is not receiving qualified power line based coordinating signals from the primary channel of that bus and is receiving qualified power line based coordinating signals from the redundant channel of that bus, and that controller is not receiving qualified power line based coordinating signals from either the primary channel or the redundant channel of the other bus and that controller determining that there is a fault on the redundant channel of one of the UPS data communications bus to which it is coupled and the data communications tie bus when that controller is not receiving qualified power line based coordinating signals from the redundant channel of that bus and is receiving qualified power line based coordinating signals from the primary channel of that bus, and that controller is not receiving qualified power line based coordinating signals from either the primary channel or the redundant channel of the other bus.

2. The system of claim 1 wherein the controller of each tie cabinet is receiving power line based coordinating signals from either the UPS data communications bus to which it is coupled or the data communications tie bus to be routed to the other bus; and when the controller of any of the tie cabinets detects that there is no fault on either the primary or redundant channel of the bus from which it is receiving power line based coordinating signals to be routed to the other bus, routing the power line based coordinating signals received on the primary channel of that bus to the primary channel of the other bus and routing the power line based coordinating signals received on the redundant channel of that bus to the redundant channel of the other bus;

when the controller of any of the tie cabinets bus detects a fault on the primary channel and not on the redundant channel of the bus from which it is receiving power line based coordinating signals to be routed to the other bus, rerouting the received power line based coordinating signals by routing the power line based coordinating signals received on the redundant channel of that bus to both the primary channel and the redundant channel of the other bus; and when the controller of any of the tie cabinets detects a fault on the redundant channel and not on the primary channel of the bus from which it is receiving power line based coordinating signals to be routed to the other bus, rerouting the power line based coordinating signals by routing the power line based coordinating signals received on the primary channel of that bus to both the primary channel and the redundant channel of the other bus.

3. The system of claim 1 wherein each UPS subsystem is a multi-module UPS subsystem having a plurality of UPS modules.

4. The system of claim 2 wherein when the controller of any of the tie cabinets detects a fault on either the primary channel or redundant channel of the bus from which it is receiving power line based coordinating signals to be routed to the other bus, sets a fault detected bit for that channel after a delay and begins rerouting the received power line based coordinating signals after the fault detected bit is set.

5. The system of claim 4 wherein the controller of any of the tie cabinets that has set a fault detected bit for either the primary or redundant channel of the bus from which it is receiving qualified power line based coordinating signals, clears the fault detected bit when it starts receiving again qualified power line based coordinating signals on that channel and ceases rerouting the received qualified power line based coordinating signals.

6. The system of claim 5 wherein the controller of any of the tie cabinets that has set a fault detected bit for either the primary or redundant channel of the bus from which it is receiving qualified power line based coordinating signals, clears the fault detected bit if it is not receiving qualified power line based coordinating signals on the primary and redundant channels of both the UPS data communications bus to which it is coupled and the primary and redundant channels of the data communications tie bus and monitoring the primary and redundant channels of both the UPS data communications bus to which it is coupled and the primary and redundant channels of the data communications tie bus for qualified power line based coordinating signals.

7. In a multiple uninterruptible power supply ("UPS") system having a plurality of UPS subsystems with a separate UPS data communications bus coupling a controller of each UPS subsystem to an associated controller of an associated tie cabinet and a data communications tie bus that couples the controllers of the tie cabinets to each other, a method of arbitrating power line based coordinating signals between the UPS data communications buses comprising monitoring with the controller of each tie cabinet the UPS data communications bus to which that controller is coupled and the data communications tie bus for qualified power line based coordinating signals and passing through with that controller a qualified power line based coordinating signal it first receives from either the UPS data communications bus to which it is coupled or the data communications tie bus to the other of the UPS data communications bus to which it is coupled or the data communications tie bus and not passing through with that controller a power line based coordinating signal from the other bus to the bus from which that controller first received the qualified power line based coordinating signal as long as that controller continues to receive qualified power line based coordinating signals from the bus from which that controller first received the qualified power line based coordinating signal;

when the controller of any tie cabinet that has been receiving qualified power line based coordinating signals from the UPS data communications bus to which it is coupled detects that it is no longer receiving qualified power line coordinating signals from that UPS data communications bus, ceasing passing through with the controller of that tie cabinet the power line based coordinating signals from that UPS data communications bus to the data communications tie bus and starting monitoring with that controller that UPS data communications bus and the data communications tie bus for qualified power line based coordinating signals; and each UPS data communications bus including a primary channel and a redundant channel and the data communications tie bus including a primary channel and a redundant channel, the method further including monitoring with the controller of each tie cabinet the primary and redundant channels of the UPS data communications bus to which the controller is coupled and the data communications tie bus for faults, determining with the controller of each tie cabinet that there is a fault on the primary channel of one of the UPS data communications bus to which it is coupled and the data communications tie bus when that controller is not receiving qualified power line based coordinating signals from the primary channel of that bus and is receiving qualified power line based coordinating signals from the redundant channel of that bus, and that controller is not receiving qualified power line based coordinating signals from either the primary channel or the redundant channel of the other bus, and determining with the controller of each tie cabinet that there is a fault on the redundant channel of one of the UPS data communications bus to which it is coupled and the data communications tie bus when that controller is not receiving qualified power line based coordinating signals from the redundant channel of that bus and is receiving qualified power line based coordinating signals from the primary channel of that bus, and that controller is not receiving qualified power line based coordinating signals from either the primary channel or the redundant channel of the other bus.

8. The method of claim 7 wherein the controller of each tie cabinet is receiving power line based coordinating signals from either the UPS data communications bus to which it is coupled or the data communications tie bus to be routed to the other bus; and
  when the method including when the controller of any of the tie cabinets detects that there is no fault on either the primary or redundant channel of the bus from which it is receiving power line based coordinating signals to be routed to the other bus, routing the power line based coordinating signals received on the primary channel of that bus to the primary channel of the other bus and routing the power line based coordinating signals received on the redundant channel of that bus to the redundant channel of the other bus;
  when the controller of any of the tie cabinets bus detects a fault on the primary channel and not on the redundant channel of the bus from which it is receiving power line based coordinating signals to be routed to the other bus, rerouting the received power line based coordinating signals by routing the power line based coordinating signals received on the redundant channel of that bus to both the primary channel and the redundant channel of the other bus; and
  when the controller of any of the tie cabinets detects a fault on the redundant channel and not on the primary channel of the bus from which it is receiving power line based coordinating signals to be routed to the other bus, rerouting the power line based coordinating signals by routing the power line based coordinating signals received on the primary channel of that bus to both the primary channel and the redundant channel of the other bus.

9. The method of claim 8 including when the controller of any of the tie cabinets detects a fault on either the primary channel or redundant channel of the bus from which it is receiving power line based coordinating signals to be routed to the other bus, setting with that controller a fault detected bit for that channel after a delay and then rerouting the received power line based coordinating signals after the fault detected bit is set.

10. The method of claim 9 including when the controller of any of the tie cabinets that has set a fault detected bit for either the primary or redundant channel of the bus from which it is receiving qualified power line based coordinating signals starts receiving again qualified power line based coordinating signals on that channel, clearing the fault detected bit that was set and ceasing rerouting the received qualified power line based coordinating signals.

11. The method of claim 10 including when the controller of any of the tie cabinets that has set a fault detected bit for either the primary or redundant channel of the bus from which it is receiving qualified power line based coordinating signals is not receiving qualified power line based coordinating signals on the primary and redundant channels of both the UPS data communications bus to which it is coupled and the primary and redundant channels of the data communications tie bus, clearing the fault detected bit that was set and monitoring with that controller the primary and redundant channels of both the UPS data communications bus to which it is coupled and the primary and redundant channels of the data communications tie bus for qualified power line based coordinating signals.

* * * * *